US008583893B2

(12) United States Patent
Pruthi et al.

(10) Patent No.: US 8,583,893 B2
(45) Date of Patent: Nov. 12, 2013

(54) METADATA MANAGEMENT FOR VIRTUAL VOLUMES (75) Inventors: Arvind Pruthi, Los Gatos, CA (US); Shailesh P. Parulekar, Pune (IN); Mayur Shardul, Pune (IN)

(73) Assignee: Marvell World Trade Ltd., St. Michael (BB)

( * ) Notice: Subject to any disclaimer, the term of this patent is extended or adjusted under 35 U.S.C. 154(b) by 247 days.

(21) Appl. No.: 12/788,097

(22) Filed: May 26, 2010

(65) Prior Publication Data

US 2010/0306467 A1 Dec. 2, 2010

Related U.S. Application Data

(60) Provisional application No. 61/243,085, filed on Sep. 16, 2009, provisional application No. 61/181,772, filed on May 28, 2009.

(51) Int. Cl.
*G06F 12/00* (2006.01)

(52) U.S. Cl.
USPC ............ 711/207; 711/136; 711/216; 711/173

(58) Field of Classification Search
USPC .......................... 711/112, 136, 173, 207, 216
See application file for complete search history.

(56) References Cited

U.S. PATENT DOCUMENTS

| 5,897,661 | A * | 4/1999 | Baranovsky et al. ......... 711/170 |
| 6,216,199 | B1 * | 4/2001 | DeKoning et al. ................. 711/3 |
| 6,745,207 | B2 | 6/2004 | Reuter et al. |
| 6,898,670 | B2 | 5/2005 | Nahum |
| 7,280,536 | B2 | 10/2007 | Testardi |
| 7,603,529 | B1 * | 10/2009 | MacHardy et al. ........... 711/162 |
| 7,725,651 | B2 | 5/2010 | Saito |
| 8,190,850 | B1 | 5/2012 | Davenport et al. |
| 2002/0019908 | A1 | 2/2002 | Reuter et al. |
| 2005/0071560 | A1 | 3/2005 | Bolik |
| 2006/0101204 | A1 | 5/2006 | Bao |
| 2006/0161810 | A1 | 7/2006 | Bao |
| 2007/0061540 | A1 | 3/2007 | Rafert et al. |
| 2007/0143559 | A1 | 6/2007 | Yagawa |
| 2007/0168634 | A1 | 7/2007 | Morishita et al. |
| 2008/0184000 | A1 | 7/2008 | Kawaguchi |
| 2009/0150641 | A1 | 6/2009 | Flynn et al. |

(Continued)

OTHER PUBLICATIONS

Walter Orb, "AIX Mirror Write Consistency with Oracle Databases", IBM/ERP Advanced Technical Support, Aug. 1999, 12 pages.*

(Continued)

*Primary Examiner* — Kalpit Parikh (57) ABSTRACT

Methods, systems, and apparatus, including computer programs encoded on a computer storage medium, manage metadata for virtual volumes. In some implementations, a method and system include defining multiple metadata blocks in a persistent storage, including information that links a virtual address space to the storage system, where the defining includes, for at least one of the multiple metadata blocks, determining multiple output addresses corresponding to the storage system, and writing the multiple output addresses and an identifier corresponding to the multiple metadata blocks in a metadata block in the persistent storage. In some implementations, a method and system include reading the multiple metadata blocks into the memory from the persistent storage, including identifying the metadata block based on the identifier; receiving an input address of the virtual address space; and obtaining a corresponding output address to the storage system using the multiple metadata blocks in the memory.

15 Claims, 7 Drawing Sheets

(56) References Cited

U.S. PATENT DOCUMENTS

| | | |
|---|---|---|
| 2010/0023685 A1 | 1/2010 | Ikejiri et al. |
| 2011/0016272 A1 | 1/2011 | Jeong et al. |
| 2011/0029713 A1 | 2/2011 | Wade et al. |
| 2011/0107052 A1 | 5/2011 | Narayanasamy |
| 2011/0185120 A1 | 7/2011 | Jess |

OTHER PUBLICATIONS

Chevance, "Server Architectures," *Elsevier Digital Press*, 782 pages (2005) (pp. Cover XVI, 32-35)

Ulrichs, Alexandra, "International Search Report and Written Opinion of the International Searching Authority," dated Jul. 30, 2010, *European Patent Office*, 13 pages, to be published by USPTO.

\* cited by examiner

METADATA MANAGEMENT FOR VIRTUAL VOLUMES

CROSS REFERENCE TO RELATED APPLICATIONS

This application claims the benefit of the priority of U.S. Provisional Application Ser. No. 61/181,772, filed May 28, 2009 and entitled "Invention Report for Persistent Metadata for Virtual Volumes", and this application claims the benefit of the priority of U.S. Provisional Application Ser. No. 61/243,085, Sep. 16, 2009 and entitled "In-Core Metadata for Virtual Volumes". The contents of both of these applications are incorporated by reference in their entirety.

BACKGROUND

The present disclosure describes systems and techniques relating to metadata management for virtual volumes.

A storage server system, such as a SAN (Storage Area Network) or NAS (Network-Attached Storage), has the primary purpose of providing shared storage that can be accessed by computers attached to the server through a network. A typical storage server is designed to serve as storage to many (10 s or 100 s or even 1000 s) computers.

Modern storage servers provide virtualized storage to its users in the form of "virtual volumes". A virtual volume hides the way the physical storage is organized and presents a uniform, virtually contiguous storage to the outside world. In other words, what a computer attached to the storage server sees as a physically contiguous space is really composed of many physically disparate chunks of storage. The virtual volume concept provides flexibility to the storage server in order to serve as storage to many computers.

In order to provide the virtualized view to the outside world, the storage server maintains metadata that translates the virtualized storage to its physical counterpart. For example, for each virtual volume, the storage server can employ a tree structure, such as a B-Tree, to keep track of the metadata that translates from an address in the virtual volume to an address in that virtual volume's physical counterpart.

SUMMARY

The present disclosure includes systems and techniques relating to metadata management for virtual volumes. According to an aspect of the described systems and techniques, a system includes a processor; a memory coupled with the processor; a storage system (e.g., a Redundant Array of Independent Disks (RAID) system) coupled with the memory (e.g., coupled through a network); and a computer-readable medium embodying a program operable to cause the processor to perform operations as described. The operations can include defining multiple metadata blocks in a persistent storage, the multiple metadata blocks including information that links a virtual address space to the physical space of the storage system, where the defining includes, for each of the multiple metadata blocks, determining multiple output addresses corresponding to the storage system, and writing the multiple output addresses and an identifier corresponding to the multiple metadata blocks in a metadata block in the persistent storage. The operations can further include reading the multiple metadata blocks into the memory from the persistent storage, the reading including identifying the metadata block based on the metadata block identifier; receiving an input address of the virtual address space; and obtaining an output address corresponding to the storage system for the input address using the multiple metadata blocks in the memory.

The memory can include a hash table data structure to access and manage multiple sets of metadata blocks corresponding to multiple virtual volumes. In addition, the hash table data structure can include multiple locations, a location including a field to save a persistent address for a given metadata block, a field to save an in-memory pointer to an in-memory copy of the given metadata block, and a field to save least recently used (LRU) information.

According to another aspect of the described systems and techniques, a method includes defining multiple metadata blocks in a persistent storage, the multiple metadata blocks including information that links a virtual address space to a storage system, where the defining includes, for at least one of the multiple metadata blocks, determining multiple output addresses corresponding to the storage system, and writing the multiple output addresses and an identifier corresponding to the multiple metadata blocks in a metadata block in the persistent storage.

The method can further include reading the multiple metadata blocks into a memory from the persistent storage, the reading including identifying the metadata block based on the identifier; receiving an input address of the virtual address space; and obtaining an output address corresponding to the storage system for the input address using the multiple metadata blocks in the memory. The reading can include generating hash values from information corresponding to each of the multiple metadata blocks; and saving each of the multiple metadata blocks in a hash table data structure in accordance with the hash values. The method can include saving multiple sets of metadata blocks corresponding to multiple virtual volumes in the hash table data structure. Moreover, the hash table data structure can include multiple locations, a location including a field to save a persistent address for a given metadata block, a field to save an in-memory pointer to an in-memory copy of the given metadata block, and a field to save least recently used (LRU) information; and the obtaining can include updating the LRU information.

According to another aspect of the described systems and techniques, a system includes a processor; a memory coupled with the processor; a storage system coupled with the memory; and a computer-readable medium embodying a program operable to cause the processor to perform operations including: reading multiple metadata blocks into the memory from a persistent storage, the reading including identifying a metadata block based on an identifier included in the metadata block along with multiple output addresses corresponding to the storage system to link a virtual address space to the storage system, the identifier corresponding to the multiple metadata blocks; receiving an input address of the virtual address space; and obtaining an output address corresponding to the storage system for the input address using the multiple metadata blocks in the memory.

The reading can include: generating hash values from information corresponding to each of the multiple metadata blocks; and saving each of the multiple metadata blocks in a hash table data structure in accordance with the hash values. The hash table data structure can include multiple sets of metadata blocks corresponding to multiple virtual volumes. In addition, the hash table data structure can include multiple locations, a location including a field to save a persistent address for a given metadata block, a field to save an in-memory pointer to an in-memory copy of the given metadata block, and a field to save least recently used (LRU) information; and the obtaining can include updating the LRU information.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

The described systems and techniques can result in a more robust storage system. For example, the metadata for a virtual volume can be stored in independent data blocks that each contain information that identifies which virtual volume and which subset of the volume that the data block describes, and information (such as checksums) that enable error detection and recovery. In addition, rather than storing a complex data structure on disk, each metadata block can include an identifier corresponding to the metadata blocks, which can be used to identify the metadata block during a sequential read from (and scan of) the persistent storage. This approach to reading virtual metadata from persistent storage can result in reduced seek time penalties.

A hash table data structure can be used for the in-core (in-memory) representation of the virtual volume metadata. This data structure can retain metadata for all the virtual volumes of a given storage system. The virtual volume metadata can be read into the system memory and organized in the data structure in a way that aides fast lookups (e.g., quick translation from virtual to logical addresses for all virtual volumes). Moreover, this in-memory copy of the metadata (also referred to as in-core metadata) can be organized in a manner that is light-weight, yet scalable and efficient.

Finally, the least recently used sections of the metadata can be readily paged out under memory pressure, which can provide significant advantages if there is common locality in the metadata being accessed, if there is insufficient memory to hold the entire metadata in memory, or if operating in failover mode in a High-Availability system (when a single system is trying to do the work of two systems).

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

The systems and techniques described herein can be implemented in one or more storage server systems, such as a SAN or NAS, in various storage environments (e.g., a storage system in an enterprise network). As used herein, a "virtual address space" is the contiguous storage space represented by a virtual volume, and a "data extent" is the unit in which space from the physical storage is allocated to virtual volumes. A data extent can be a physically contiguous chunk of data or a set of physically contiguous RAID stripes (if the underlying storage is available in terms of RAID).

Figure 1:
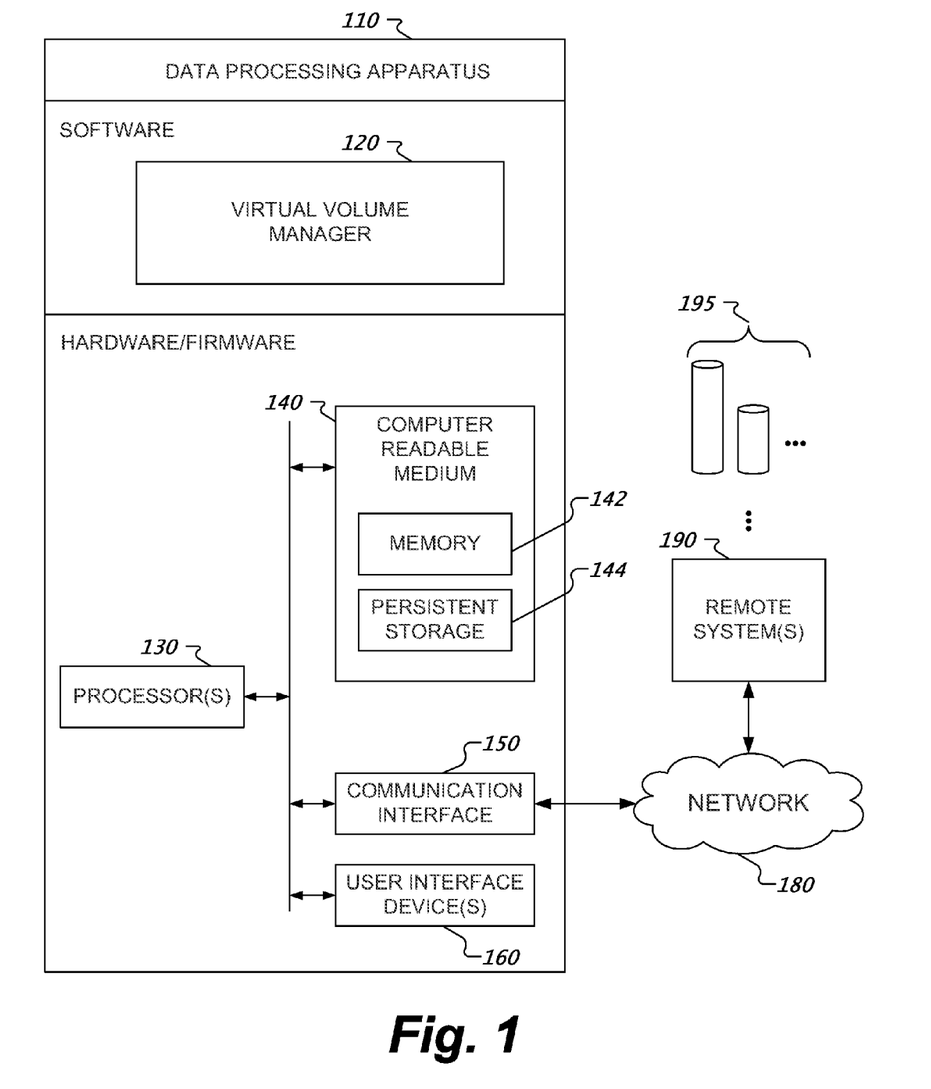
FIG. 1 shows an example of a system that manages metadata for virtual volumes.

FIG. 1 shows an example of a system that manages metadata for virtual volumes. A data processing apparatus 110 includes hardware/firmware, which provides the hardware platform, and software that runs on this hardware platform. The data processing apparatus 110 includes one or more processors 130 and at least one computer-readable medium 140. The data processing apparatus 110 can also include a communication interface 150, and one or more user interface devices 160.

The communication interface 150 provides access to one or more remote systems 190 (e.g., a RAID system) over a data communication network 180 (e.g., an Enterprise network, the Internet, a Virtual Private Network). Access to the communication interface 150 can be provided to various programs through a network stack, an operating system of the apparatus 110, or a combination of these.

The user interface device(s) 160 can include display screen(s), keyboard(s), mouse, stylus, other user input/output devices, or any combination thereof. Moreover, the data processing apparatus 110 can itself be considered a user interface device. Thus, the apparatus 110 represents multiple types of computing systems, including, for example, a personal computer running a virtual volume manager program 120, a server computer or network device within a storage server system, or a dumb terminal through which the virtual volume manager program 120 is remotely provided.

The computer readable medium 140 can encode the virtual volume manager 120, which can perform various operations as described herein. The computer readable medium 140 can include a memory 142, a persistent storage 144, or both. The memory 142 can be any form of volatile memory, such as Random Access Memory (RAM), which is used to store code and data for running programs. Volatile memory is a memory device that requires power to maintain its state, such that when power to the device is interrupted, any saved data is lost due to the nature of the memory device itself. In contrast, persistent storage 144 includes any storage device that is not dependent on supplied power to retain saved memory state, such as flash memory devices, magnetic disks (e.g., disks in an internal hard drive of the computer system), magneto optical disks (e.g., a re-writeable DVD-ROM disk), etc.

The virtual volume manager 120 loads metadata for accessing virtual volumes 195 into the memory 142 from persistent storage, which can be the persistent storage 144 or persistent storage available in remote system(s) 190 (e.g., the metadata can be stored persistently in the same underling RAID system to which the metadata maps virtual input addresses). Each of the virtual volumes 195 is presented as a contiguous storage space even though the storage space may be in fact divided among many physical storage devices, e.g., multiple different hard disks, multiple different RAID groups, etc. Physical space for the virtual volumes 195 can be allocated from one or more resources in the remote system(s) 190. For example, the virtual volumes 195 can be allocated physical space from a storage pool formed from RAID groups assigned to that storage pool.

The virtual volumes 195 can be exported to the outside world (programs and users) in various manners, as is known in the art, such as through an application (e.g., an email server application) or an operating system resource (e.g., an "E:" drive in a WINDOWS® computer system). In order to provide a virtualized view to the outside world, the virtual volume manager 120 maintains metadata that translates the virtualized storage to its physical counterpart. The metadata provides a mapping to convert input virtual addresses to output addresses that correspond to the physical storage system (e.g., logical addresses in a RAID system). The metadata is persistent because it is always retained in persistent storage somewhere so that the metadata is not lost in the event of a power failure or other unexpected shutdown.

The virtual volume manager 120 can be a virtual volume layer in a data storage system that maintains a mapping between the virtual and the logical addresses for every virtual volume. The virtual volume persistent metadata provides a persistent mapping between virtual addresses and the corresponding logical addresses (e.g., in a RAID system) or physical addresses (e.g., to an actual disk drive). The virtual volume persistent metadata can be efficiently stored and managed, as described herein. Moreover, the virtual volumes 195 can be created as relatively small spaces and then be expanded later into larger spaces, as desired, and more physical storage devices can be added as needed. Furthermore, the system can readily support sparse virtual volumes 195, as detailed further below.

Figure 2:
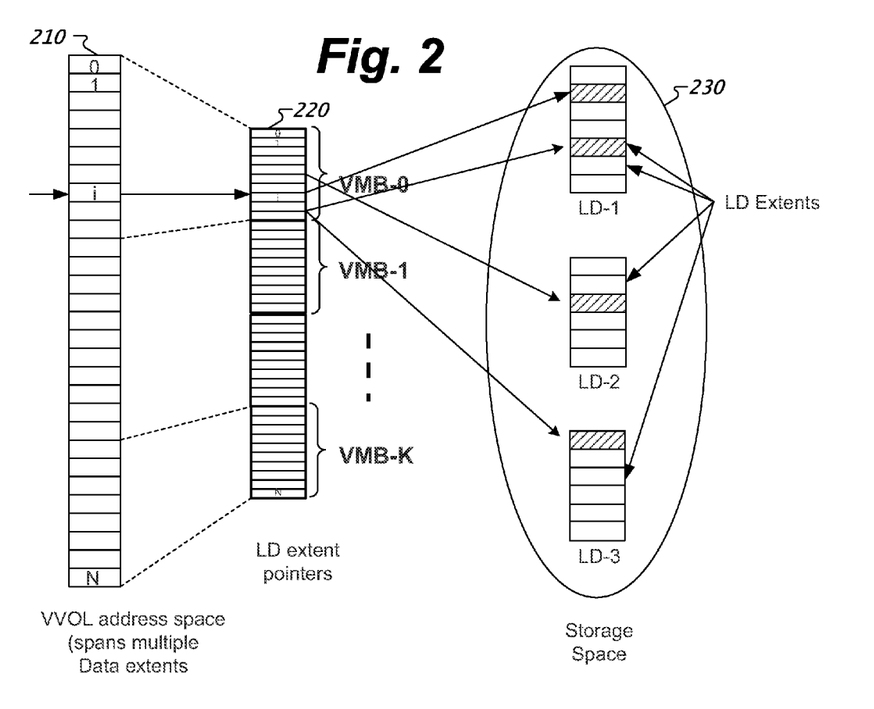
FIG. 2 shows an example of mapping a virtual volume address space to physical storage space.

FIG. 2 shows an example of mapping a virtual volume address space 210 to physical storage space 230. A virtual volume exports a virtually contiguous storage device that can be addressed using virtual addresses in the virtual volume address space 210. The virtual volume address space 210 spans multiple data extents, and the virtual volume can be addressed by a series of virtual blocks (0 . . . N-1) where N is the total number of (fixed-sized) blocks exported by the virtual volume. Moreover, the virtual volume persistent metadata for every virtual volume can be stored as a series of virtual metadata blocks 220 (VMB-0, VMB-1, [ . . . ] VMB-K).

As shown in FIG. 2, the various data extents of the virtual volume can come from entirely different locations in a physical storage system (e.g., different logical disks (LD) in a RAID system as shown). A virtual address from the space 210 can be mapped to an output address (a pointer entry) in a specific VMB of the entire set of VMBs 220. This mapping can be readily performed using a mathematical formula. For example, the input can correspond to block offset→offset in Virtual Volume address space in terms of 4K blocks, and the output can correspond to a Virtual Metadata Block Number (VMBN) and an index of an extent pointer in a VMB. The system constraints can include: X=Number of extent pointers within a VMB (e.g., 500), and Y=Number of blocks within extent (e.g., a 1 megabyte (MB) extent can have 128 blocks of 4 kilobytes (KB) each). The VMBN can be found using the following formula:

$$VMBN=[\text{Block offset}/(X*Y)], \text{ where the index of the extent within the } VMB=(\text{Block offset}/Y)\text{Modulo } (X).$$

Each output address (or pointer) in a VMB (e.g., VMB-0 in FIG. 2) corresponds to a specific data extent in the storage space 230. For example, a bunch of disks (or subdisks, where a subdisk is a fixed sized partition from within a disk) can be grouped to create a RAID device. The RAID device can be exported as a Logical Disk to its users. A logical disk can be addressed using Logical Addresses (LD_ID+LD_OFFSET=0 . . . M-1, where M is the total number of fixed sized blocks supported by the RAID device). Translation between logical addresses (LD_ID+LD_OFFSET) and physical addresses (DISK_ID+DISK_OFFSET) can be done using simple mathematics within the RAID system.

Thus, an output address from each VMB can be a physical address (e.g., DISK_ID+DISK_OFFSET) or a logical address (e.g., LD_ID+LD_OFFSET) for a data extent. The size of the data extents can be set as a system parameter by a system administrator (e.g., set to 1 megabyte, 16 megabytes, or 48 megabytes per data extent). Note that setting a smaller extent size generally increases flexibility (e.g., in setting virtual volume size), but also results in more scattered data in the physical storage system, which can impact data access performance.

Figure 3:
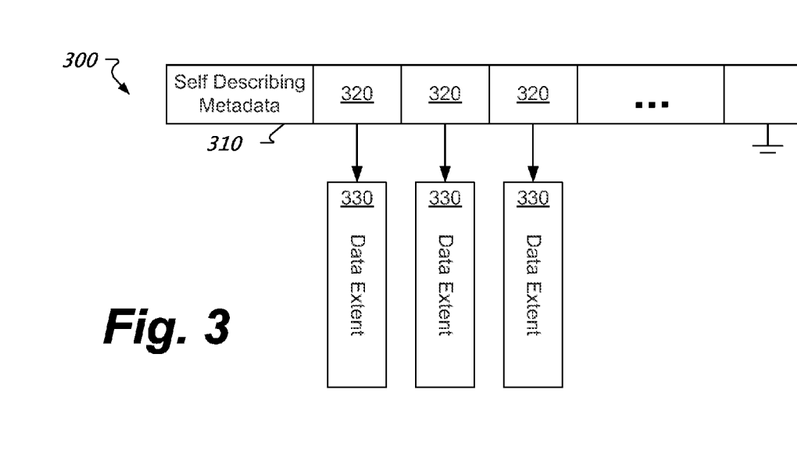
FIG. 3 shows an example of a virtual metadata block (VMB).

FIG. 3 shows an example of a VMB 300. Each VMB 300 can maintain a map of virtual input addresses to output addresses for a fixed (virtually contiguous) subset of a virtual volume. Each VMB 300 can consist of two entities: "self-describing metadata" (or meta-metadata) 310, and a series of persistent pointers 320. The meta-metadata 310 can include information sufficient to identify which virtual volume and which subset of the volume that the VMB 300 describes (e.g., a virtual volume identifier and a VMB number) and also an identifier corresponding to all the VMBs.

This general VMB identifier can be a predefined bit pattern that is included in all VMBs stored on disk for use in identifying the VMBs when reading them from disk. The predefined bit pattern should be sufficiently long (and possibly unique) to minimize the likelihood of the same bit pattern being present in regular data blocks. More than one copy of the predefined bit pattern can be included in each VMB (e.g., two copies of the bit pattern at disparate locations in the VMB on disk) to improve robustness in the event that one of the copies is somehow corrupted. Furthermore, the meta-metadata 310 can also contain data integrity fields (e.g., checksums) that add to the robustness of the persistent data, and various bookkeeping data fields (e.g., a software version number to assist in future backward compatibility support).

The series of pointers 320 can be a fixed number (e.g., five hundred) of pointers, which are output addresses corresponding to the mapped data extents 330 (e.g., each pointer can be LD_ID+LD_OFFSET). The output addresses can be logical addresses or physical addresses. Note that in the case of logical addresses, the logical address to physical address mapping need not be stored since it is a simple mathematical translation, which can be handled by the underlying RAID system.

Since each persistent pointer 320 describes the mapping for an entire extent, a relatively small sized VMB can describe a huge area of the virtual volume. For example, if the extent size is 1 MB, each persistent pointer takes up 8 bytes and a VMB has five hundred pointers, a single VMB of 4 KB can provide a mapping to 500 MB of virtual volume metadata. The remaining 96 KB within the VMB (1 MB extent size minus 4 KB for pointers, when each VMB is assigned to a single data extent) can be used for meta-metadata.

Note that each VMB 300 can be independent of other VMBs 300, which can improve the robustness of the system. There does not need to be any (persistent) tree or linked-list style structure that links the different VMBs for a virtual volume together when they are stored on disk. Each VMB 300 can be entirely self-contained with self-describing metadata. All VMBs 300 for a virtual volume can reside in close vicinity on persistent storage (e.g., on top of a well-protected RAID layer). Thus, upon boot-up of the storage server, all VMBs of a virtual volume can be efficiently read by doing a single, sequential read from the persistent storage to build up the in-core metadata structures that can then serve the data. The self-describing nature of the VMBs and the fact that they are not linked using complex data structures on disk, can make them very resilient for storing persistent metadata. This is, in part, because simpler structures are less vulnerable to data corruption in case of uncommon or bizarre scenarios.

Figure 4:
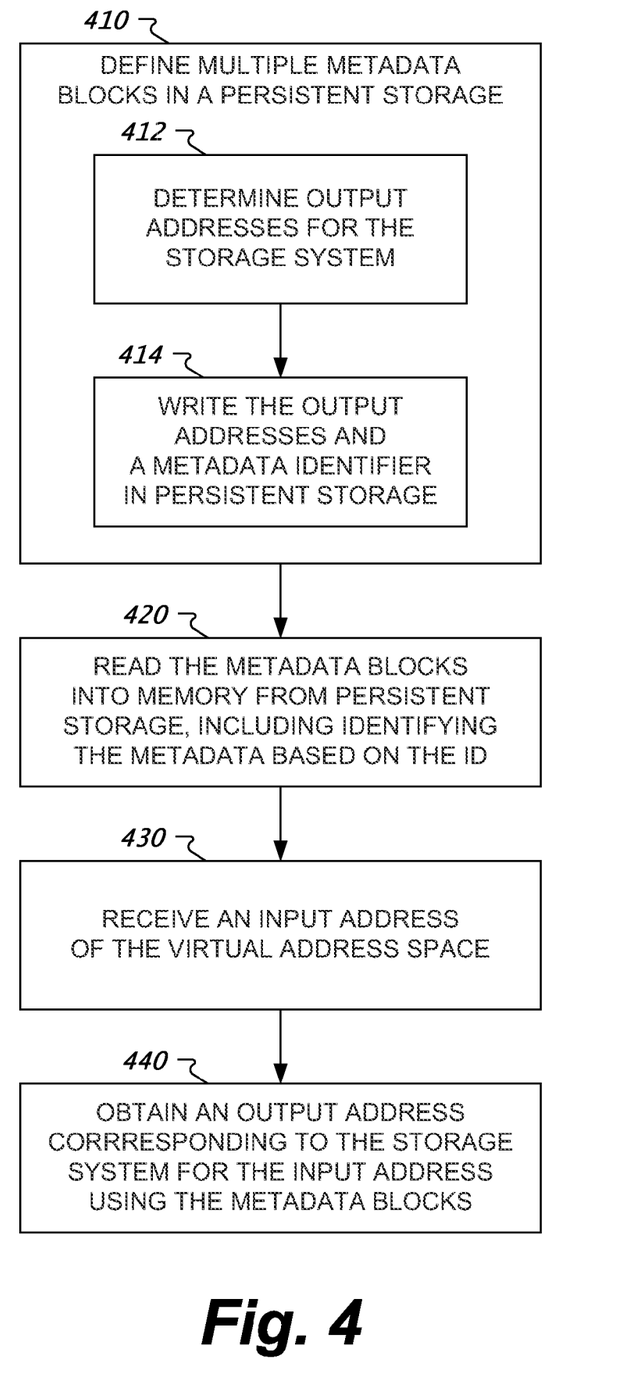
FIG. 4 shows an example of a process for managing metadata for virtual volumes.

FIG. 4 shows an example of a process for managing metadata for virtual volumes. At 410, multiple metadata blocks are defined in a persistent storage. The multiple metadata blocks include information that links a virtual address space (i.e., a virtual volume) to a storage system. The defining can include, for each of the multiple metadata blocks, at 412 determining multiple output addresses corresponding to the storage system, and at 414 writing the multiple output addresses and an identifier corresponding to the multiple metadata blocks in a metadata block in the persistent storage.

The multiple output addresses can be determined based on a formula or a separate process for allocating data extents. The writing can include writing a virtual volume identifier for the metadata block, and other information (e.g., virtual volume, volume subset, and checksum information, as described above) to disk for each metadata block. Defining the metadata blocks can include writing the multiple metadata blocks to a defined area of the persistent storage (e.g., on top of a well-protected RAID layer) without writing to the persistent storage a data structure linking the multiple metadata blocks together. In addition, the process can also include writing additional metadata to manage the multiple metadata blocks and allocation of space from a storage pool. For further details regarding such additional metadata, see U.S. Patent Application No. 61/307,804, filed on Feb. 24, 2010, entitled "Virtual Volume Metadata Bag", which is hereby incorporated by reference.

At 420, the multiple metadata blocks can be read into a memory from the persistent storage. The reading can be from a separate segregated space. The reading can include identifying each metadata block, as such, based on the identifier. For example, the identifier can be used to read the metadata blocks when other on-disk access data is corrupted and links to the metadata blocks have been lost. The identifier can be a predefined bit pattern that is included in all VMBs stored on disk, and the system can scan for this predefined bit pattern when reading data from disk in order to identify a VMB. Thus, the metadata blocks can be stored on disk independent of each other, with no need for a linking data structure on disk.

Moreover, the metadata blocks can be stored in the same underlying storage system to which the virtual volume is mapped (e.g., the VMBs can be stored in an underlying RAID system to which the VMB pointers refer). Thus, reading the multiple metadata blocks can involve reading the multiple metadata blocks into the memory from the storage system to which the metadata blocks refer.

At 430, an input address of the virtual address space is received. This can include receiving the input address from software that manages the virtual volumes, from a separate program that interfaces with the virtual volume system, or from a user. At 440, an output address corresponding to the storage system for the input address is obtained using the multiple metadata blocks in the memory. Various in-memory data structures can be used to save and retrieve the metadata blocks, such as a hash table data structure described further below. In any case, it will be appreciated that not all of the metadata blocks need to be read into memory at one time. Rather a proper subset of the metadata blocks can be read into memory initially, and more metadata blocks can be read into memory (potentially causing other in-memory metadata blocks to be deleted, or swapped out, to free up memory space) as needed. For further details, see U.S. Patent Application No. 61/307,804, filed on Feb. 24, 2010, entitled "Virtual Volume Metadata Bag".

Figure 5:
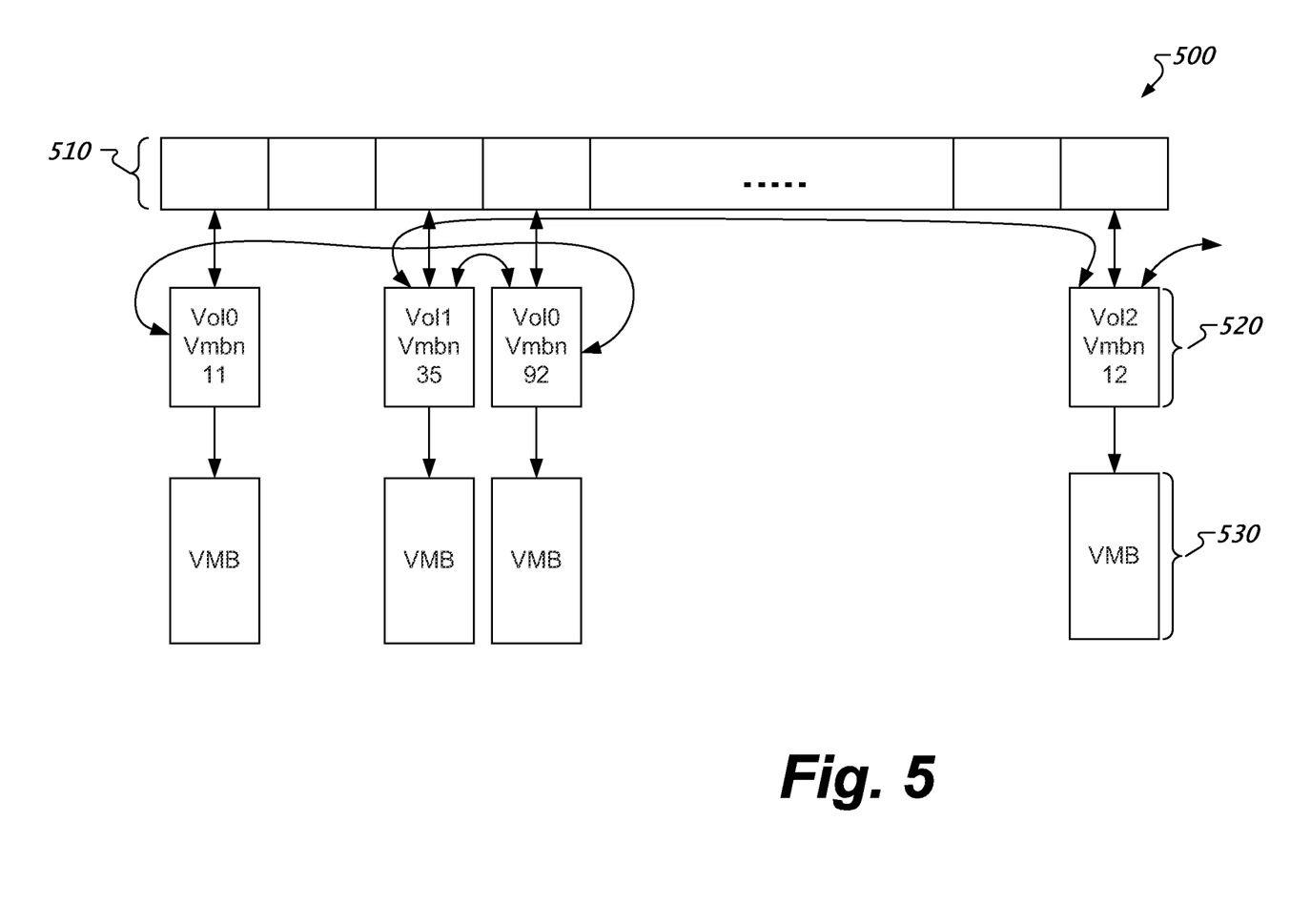
FIG. 5 shows an example of a data structure for managing virtual volume metadata in memory.

FIG. 5 shows an example of a hash table data structure 500 for managing virtual volume metadata in memory. A single common hash table 510 can be used for all the virtual volumes on a given storage system. This can provide advantages in the event of over-provisioning for and allocation of large, sparse virtual volumes. For example, even when many over-provisioned virtual volumes are created in the system, the allocation of space for managing the metadata can be prevented from exceeding the total physical memory space of the system.

Each hash bucket can point to one or more VMB descriptors 520. The hash table 510 can be made large enough to significantly reduce the chances of hash table collisions. For example, the system can be over-provisioned to around twenty to thirty percent beyond the total space the system has to offer. The over-provisioning can be a system policy kept in order to accept some level of overheads, where different systems can have different amount of support for over-provisioning based on customer needs, available resources, etc. In addition, the hash table size can be kept at double the number of VMBs that are used to map storage space in case of maximum allowed over-provisioning.

Nonetheless, in the event that more than one VMB hashes to the same bucket, multiple VMB descriptors can be associated with a single bucket location in the hash table 510 (e.g., a linked list of VMB descriptors can be chained from each bucket location in the hash table 510). A hash key (i.e., VVOLid+offset) can be used to resolve hash collision. This can be included in every in-core VMB.

Each VMB descriptor 520 can include a persistent address for the VMB to indicate where the persistent copy of the VMB can be located on disk (e.g., LD_ID+LD_OFFSET for the VMB). Each VMB descriptor 520 can further include a pointer to an in-memory (in-core) copy of the VMB 530, least recently used (LRU) previous and next pointers, and various flags (such as IN_CORE, SWAPPED_OUT, and other miscellaneous data used to manage the data structure 500).

The hash table data structure 500 can represent the in-core metadata of virtual volumes in an efficient manner that readily provides a very fast translation from virtual to logical addresses. This is due to the nature of the hash table itself and how access is made through the hash table, as described. Moreover, the structure 500 can facilitate dynamic access to the virtual volume metadata in a manner that lends itself to page-in, page-out of portions of metadata under memory pressure. For example, a least recently used (LRU) queue can be maintained to control the total space taken by in-core metadata and to reduce the total number of page-in/page-out transactions.

Using a LRU queue, in-core VMBs that are used least frequently compared to other VMBs can be identified. When a VMB is needed in memory, and the total amount of memory taken by all VMBs is more than a predetermined threshold, which can be a configurable parameter generally devised by taking in to account the memory available in the system, an existing in-core VMB can be selected for eviction using LRU logic to provide a VMB that is unlikely to be used in near future. Alternatives to the LRU include an Adaptive Replacement Cache (ARC) and its variants, such as CAR (Clock with Adaptive Replacement) and CLOCK.

It should be noted that the hash table data structure 500 readily supports sparse, on-demand, thin provisioned virtual volumes. Thin provisioned volumes are virtual volumes for which storage space is provisioned in small chunks (e.g., 1 MB data extents). These volumes can usually be grown through specified administrative commands and provide enormous flexibility, since volumes can be created small, but grown arbitrarily any number of times in small chunks.

On-demand thin provisioned volumes are thin provisioned volumes for which no space is provisioned at creation time. Storage space for such volumes is provisioned automatically (on-demand) when the volume is written to. Since the volume is thin provisioned, only a small chunk (depending on the thin provision size) of space is provisioned corresponding to the area of the volume that is accessed.

Sparse volumes are on-demand, thin provisioned virtual volumes for which a large percentage of storage space has not been provisioned. Also, most sparse volumes have one or more hot spots (one or more scattered sections of this thin volume that are read/written repeatedly) while a majority of the volume is never accessed. Thus, sparse volumes often generate common locality in the metadata being accessed.

The hash table 510 and the VMB descriptors 520 can be created in memory at boot-up time and can remain in existence in the memory until the system is shutdown. Note that the amount of space consumed by the hash table 510 and the VMB descriptors 520 may be a small portion of the overall memory needed for the metadata. For example, a VMB size of 4 KB with five hundred persistent pointers in each VMB can point to 500 MB of storage space in the case of 1 MB data extents (one pointer per data extent). A hash table 510 with 100,000 bucket locations in this implementation can point to 50 TB of storage space (500 MB×100,000). If each hash table bucket needs 8 bytes (assuming a 64-bit system) and each VMB descriptor needs 64 bytes, the memory space required for the hash table 510 and descriptors 520 (with 100,000 buckets) is about 7 MB. By today's standards, 7 MB is a very small memory requirement from a system that is capable of serving up to 50 TB of data.

The remaining memory space required by the metadata index is in the form of in-core shadow copies of the persistently stored VMBs. Together with VMB descriptors, the VMBs can be thought of as a dynamic cache for VMBs. At system start-up, a significant amount of memory can be allocated for the VMB cache, causing most or all VMBs to be loaded in cache (i.e., in memory). Over time, if the system starts experiencing memory constraints, the cache can be dynamically resized to swap out unused or least recently used VMBs, thus freeing up memory space.

Figure 6A:
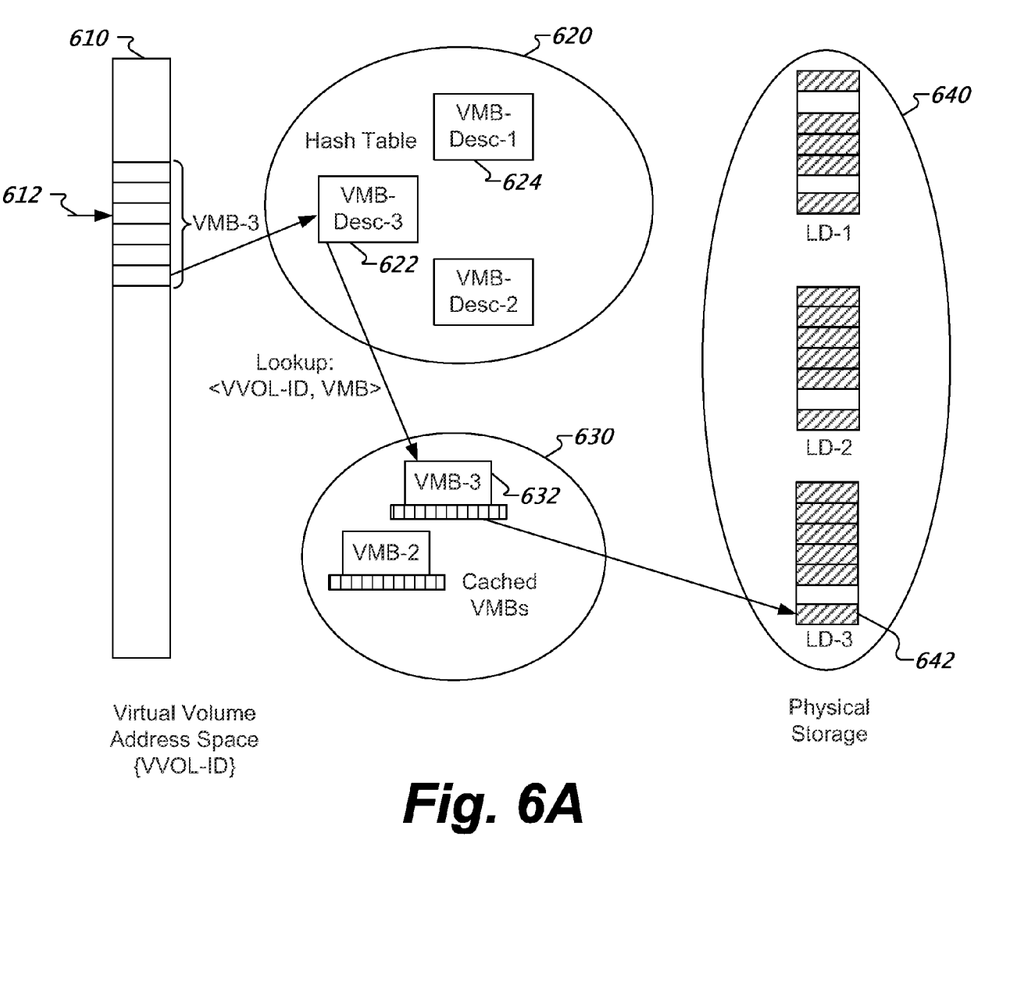
FIG. 6A shows an example of metadata access through a cached virtual metadata block.

FIG. 6A shows an example of metadata access through a cached virtual metadata block. A virtual address 612 in a virtual address space 610 is determined to reference VMB-3, which is hashed in a hash table 620 to locate VMB descriptor 622. The VMB descriptor 622 indicates that VMB-3 632 is already cached in memory 630, and the VMB-3 632 can thus be used to locate data extent 642 in the physical storage 640.

Figure 6B:
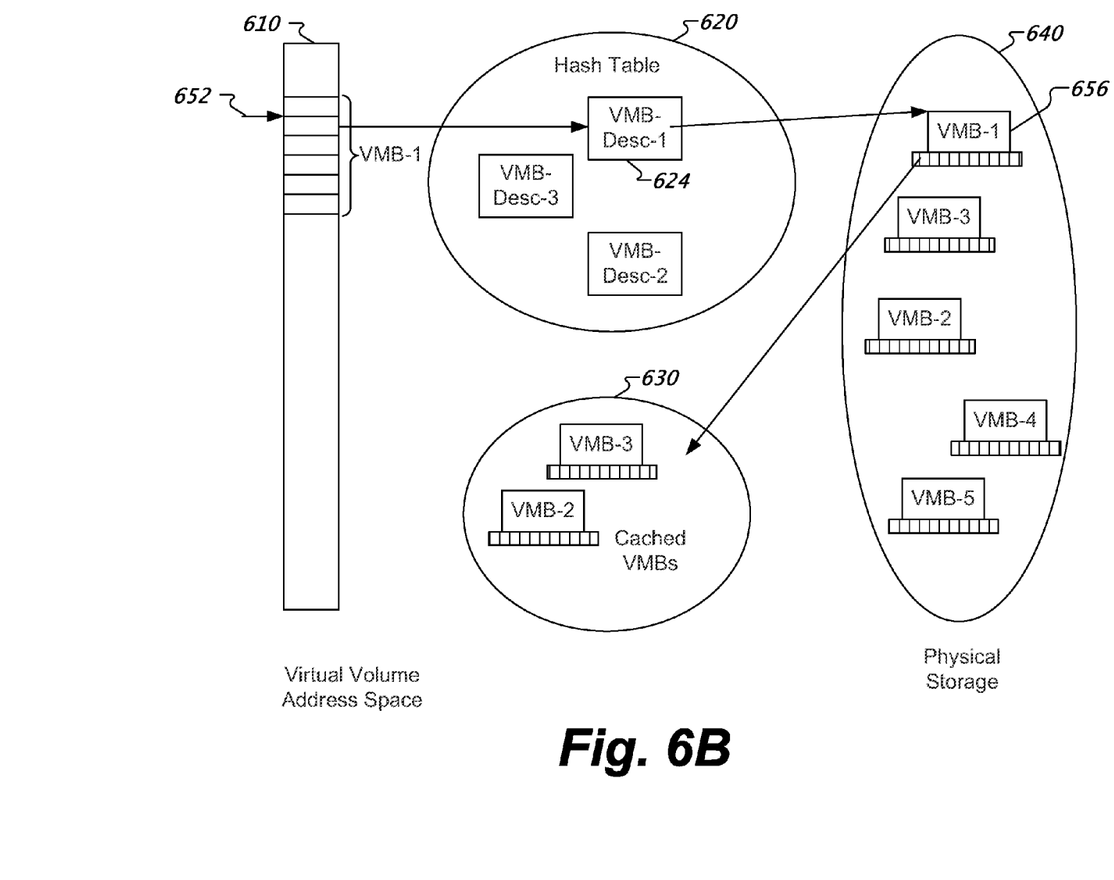
FIG. 6B shows an example of metadata access through an un-cached virtual metadata block.

FIG. 6B shows an example of metadata access through an un-cached virtual metadata block. In this case, a virtual address 652 in the virtual address space 610 is determined to reference VMB-1, which is hashed in the hash table 620 to locate VMB descriptor 624. The VMB descriptor 624 indicates that VMB-1 656 is not cached in memory 630, either because it has not previously been loaded or was previously swapped out of memory in favor of another VMB. Thus, the VMB-1 656 is loaded from physical storage 640 into the cache memory 630, where it can then be used to locate a data extent in the physical storage 640.

Figure 7:
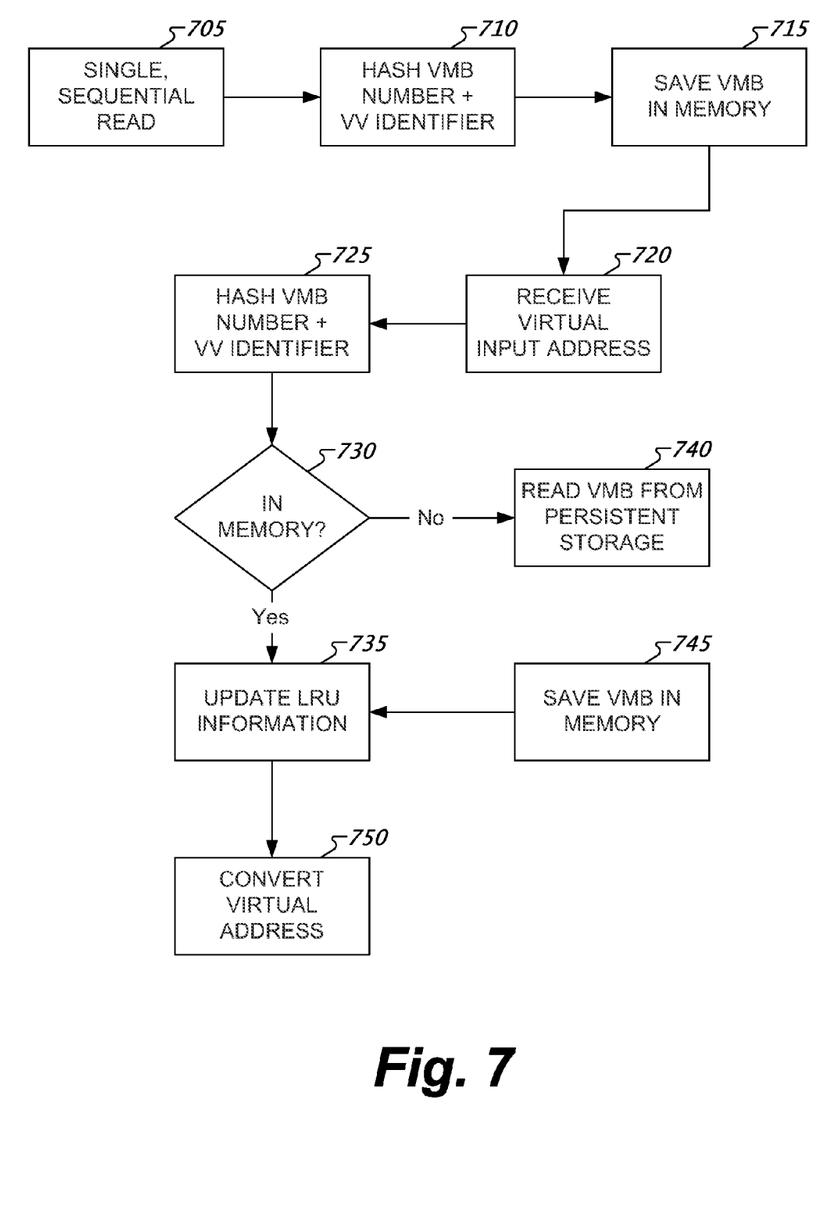
FIG. 7 shows another example of a process for managing metadata for virtual volumes.

FIG. 7 shows another example of a process for managing metadata for virtual volumes. At 705, a single, sequential read from a defined area of a persistent storage can be performed. During this read, the data can be scanned for the VMB identifier to locate all the VMBs in the defined area, including VMBs for multiple different virtual volumes. Note that this can result in reduced seek time penalties to initialize the data structure since, in typical enterprise hard disk systems, the seek time to get to a particular block is often around 3-4 milliseconds, whereas the read time to read a particular block is often on the order of 14 microseconds. Thus, by avoiding the need traverse a data structure stored on disk during the initial load into memory, the time needed to load the metadata can be substantially reduced. Note that on low end systems which do not have adequate resources (memory) to hold all the metadata, the VMBs can be scanned and in-core VMB descriptors only may be created; the VMBs need not be kept in-core, but can paged-in as needed based on user accesses.

At 710, information for each VMB can be hashed to locate its place in the hash table. This information can be the number of the VMB (i.e., the index of the VMB within the virtual volume) plus the identifier of the virtual volume to which the VMB corresponds. At 715, each VMB can be saved in the hash table data structure in accordance with the hash result. This can involve saving, for each VMB, the persistent address of the VMB in the persistent storage, the VMB itself in memory, and an in-memory pointer to the in-memory copy of the VMB.

At 720, a virtual input address can be received, and the corresponding VMB information (e.g., VMB number and virtual volume identifier) can be determined from the virtual input address. At 725, this VMB information can be hashed to locate the VMB's place in the hash table. At 730, a check can be made as to whether or not the desired VMB is currently in-memory. This can involve checking a flag in the VMB descriptor or checking to see if the pointer to the expected in-memory shadow copy of the VMB is in fact a NULL pointer. At 740, if the VMB is not cached in memory, the VMB can be read from the persistent storage using the persistent address of that VMB found in the hash table data structure. At 745, the VMB can then be saved in the memory.

At 735, with the desired VMB found or cached in memory, the LRU information for that VMB can be updated. At 750, the virtual input address can be converted into an output address for the storage system using the in-memory copy of the VMB. As described above, the virtual input address specifies an entry in the VMB, and the data in that entry in the VMB is the output address (e.g., LD_ID+LD_OFFSET) for the storage system.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising: a processor; a memory coupled with the processor; a storage system coupled with the memory; and a computer-readable medium embodying a program operable to cause the processor to perform operations comprising: defining multiple metadata blocks in a persistent storage, the multiple metadata blocks comprising information that links a virtual address space to the storage system, where the defining includes, for each one of the multiple metadata blocks, determining multiple output addresses corresponding to the storage system, and writing the multiple output addresses, which correspond to the one metadata block, and an identifier corresponding to the multiple metadata blocks, in the one metadata block in the persistent storage; where the memory comprises a hash table data structure to access and manage multiple sets of the metadata blocks corresponding to the multiple virtual volumes; and where the hash table data structure comprises multiple locations, a location including a field that saves a persistent address for a given metadata block, a field that saves an in-memory pointer to an in-memory copy of the given metadata block, and a field that saves least recently used (LRU) information.

2. The system of claim 1, the operations comprising: reading the multiple metadata blocks into the memory from the persistent storage, the reading comprising identifying each of the multiple metadata blocks based on the identifier corresponding to the multiple metadata blocks;
receiving an input address of the virtual address space; and
obtaining an output address corresponding to the storage system for the input address using the multiple metadata blocks in the memory.

3. The system of claim 2, where the storage system comprises a RAID system comprising the persistent storage.

4. The system of claim 2, where the writing comprises writing a virtual volume identifier for the metadata block, and the defining comprises writing the multiple metadata blocks to a defined area of the persistent storage without writing to the persistent storage a data structure linking the multiple metadata blocks together.

5. The system of claim 4, where the reading comprises performing a single, sequential read from the defined area of the persistent storage.

6. A method comprising: defining multiple metadata blocks in a persistent storage, the multiple metadata blocks comprising information that links a virtual address space to a storage system, where the defining includes, for each one of the multiple metadata blocks, determining multiple output addresses corresponding to the storage system, and writing the multiple output addresses, which correspond to the one metadata block, and an identifier corresponding to the multiple metadata blocks, in the one metadata block in the persistent storage; reading the multiple metadata blocks into a memory from the persistent storage, the reading comprising identifying each of the multiple metadata blocks based on the identifier corresponding to the multiple metadata blocks; receiving an input address of the virtual address space; and obtaining an output address corresponding to the storage system for the input address using the multiple metadata blocks in the memory; where the reading comprises: generating hash values from information corresponding to each of the multiple metadata blocks; and saving each of the multiple metadata blocks in a hash table data structure in accordance with the hash values; where the hash table data structure comprises multiple locations, a location including a field that saves a persistent address for a given metadata block, a field that saves an in-memory pointer to an in-memory copy of the given metadata block, and a field that saves least recently used (LRU) information; and the obtaining comprises updating the LRU information.

7. The method of claim 6, where the storage system comprises the persistent storage, and reading the multiple metadata blocks comprises reading the multiple metadata blocks into the memory from the storage system.

8. The method of claim 6, where the writing comprises writing a virtual volume identifier for the metadata block, and the defining comprises writing the multiple metadata blocks to a defined area of the persistent storage without writing to the persistent storage a data structure linking the multiple metadata blocks together.

9. The method of claim 8, where the reading comprises performing a single, sequential read from the defined area of the persistent storage.

10. The method of claim 6, comprising saving multiple sets of metadata blocks corresponding to multiple virtual volumes in the hash table data structure.

11. A system comprising: a processor; a memory coupled with the processor; a storage system coupled with the memory; and a computer-readable medium embodying a program operable to cause the processor to perform operations comprising: reading multiple metadata blocks into the memory from a persistent storage, the reading comprising identifying each respective metadata block of the multiple metadata blocks based on an identifier included in the metadata block along with multiple output addresses corresponding to the storage system to link a virtual address space to the storage system, the identifier corresponding to the multiple metadata blocks, receiving an input address of the virtual address space, and obtaining an output address corresponding to the storage system for the input address using the multiple metadata blocks in the memory; where the reading comprises: generating hash values from information corresponding to each of the multiple metadata blocks, and saving each of the multiple metadata blocks in a hash table data structure in accordance with the hash values; where the hash table data structure comprises multiple locations, a location including a field that saves a persistent address for a given metadata block, a field that saves an in-memory pointer to an in-memory copy of the given metadata block, and a field that saves least recently used (LRU) information; and the obtaining comprises updating the LRU information.

12. The system of claim 11, where the storage system comprises the persistent storage, and reading the multiple metadata blocks comprises reading the multiple metadata blocks into the memory from the storage system.

13. The system of claim 11, where the metadata block includes a virtual volume identifier, and the multiple metadata blocks are located in a defined area of the persistent storage, which doesn't include a data structure linking the multiple metadata blocks together.

14. The system of claim 13, where the reading comprises performing a single, sequential read from the defined area of the persistent storage.

15. The system of claim 11, where the hash table data structure includes multiple sets of metadata blocks corresponding to multiple virtual volumes.

\* \* \* \* \*